United States Patent Office 2,797,603
Patented July 2, 1957

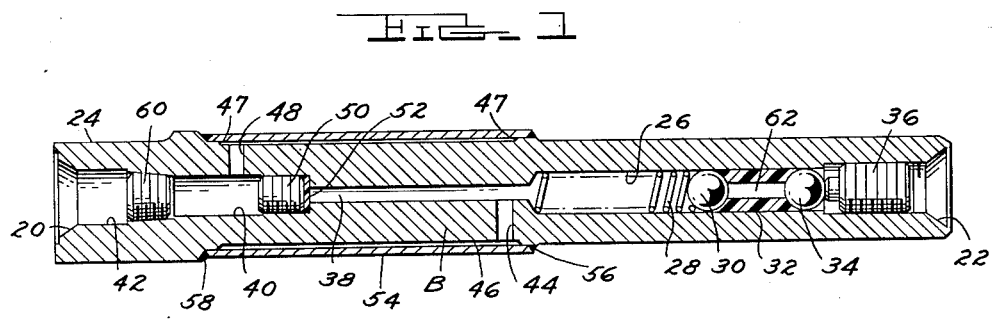
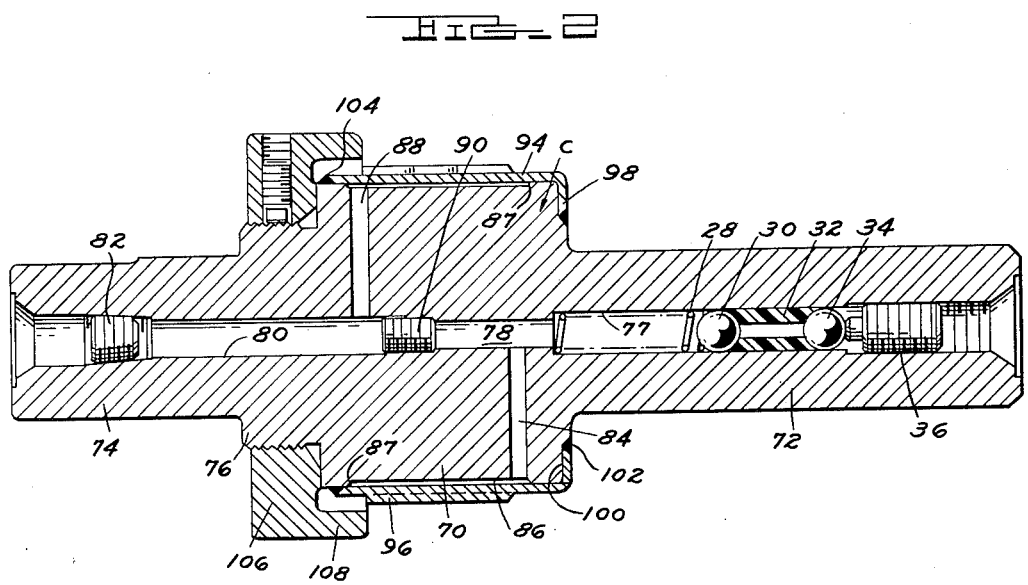

2,797,603

HYDROSTATIC HOLDING DEVICE

George L. Atherholt, Flint, and George L. Atherholt, Jr., Ferndale, Mich.

Application February 5, 1954, Serial No. 408,506

3 Claims. (Cl. 82—44)

This invention relates to a hydrostatic holding device and particularly to that type of device which is called an expanding mandrel or chuck for either external or internal holding units.

Devices of this hydrostatic type are illustrated in the Christman Patent 1,818,042 of August 11, 1931, and the Conradson Patent 2,318,838 of May 11, 1943. Our copending application Serial No. 359,886, filed June 5, 1953 relates also to similar devices.

It is an object of the present invention to provide a housing with an expanding sleeve which is securely fastened to the housing and which will withstand the pressures required of it as an expanding mandrel.

Various objects and features of the invention will be apparent in the following description and claims.

Drawings accompany the disclosure, and the various views thereof may be briefly described as:

Figure 1, a sectional view showing an elongate type of body and sleeve.

Figure 2, a sectional view showing a modified device utilizing a shorter and somewhat enlarged diameter holder.

Referring to the drawings, in Figure 1 a cylindrical body B is shown having conical openings 20 and 22 at opposite ends for mounting in a centering device. A flat 24 is provided at one end for driving, and at the other end a central bore 26 holds a pressure creating assembly described in detail in our previously identified application.

In brief, this assembly includes a spring 28, a ball 30, a Tygon sleeve 32, a ball 34 and a screw plug 36. The bore 26 continues in a smaller bore 38 which enlarges into a bore 40 at the other end of the unit, the bore 40 enlarging into the opening 42 leading to the conical opening 20. From bore 38 a transverse passage 44 leads to a narrowed annular recess 46 formed on the outside of the body. At the other end of the recess from passage 44 a passage 48 leads to bore 40. A screw plug 50 holds Tygon washer 52 in place to seal the end of bore 38.

Around the annular recess 46 in the outer surface of the body B is a sleeve 54 formed preferably of high-grade steel, such as 8620 steel, preferably with no sulphur content. This steel sleeve 54 is hydrogen welded at each end at 56 and 58 directly to the body so that the recess 46 is closed circumferentially to provide a relatively thin, axially extending annular recess under the sleeve 54. With this arrangement, the device is filled with a non-compressible material, such as oil, but preferably a heavy grease-like material, by removing a plug 60 and feeding the material through passages 40 and 48 into the recess 46 and out through passage 44 to the bore 26.

When all of the air has been removed from the passages and recesses so that grease is flowing out of the bore 26, then the spring 28 is inserted together with the various elements 30, 32 and 34, it being important that the central bore 62 of the element 32 be filled with grease. Then, upon forcing in the plug 36, pressure is developed in the recess 46 as defined in the aforesaid application.

The present invention contemplates a construction wherein the pressure within the recess 46 is exerted primarily outward to expand the shell 54. A relatively small amount of force is exerted against the end surfaces 47 of the recess 46 because those surfaces have relatively small area as shown in the drawing. This construction eliminates the tendency of previous constructions because of the greater area of their end surfaces to blow out their ends. Moreover, with the axially continuous body B underneath the shell 54, there is no tendency for the device to destroy itself by the internal pressures.

A modified construction utilizing the same principle is shown in Figure 2, wherein a body C is composed of a main central portion 70 having a concentric end extension portion 72 at one end and a similar extension 74 at the other end. Between the body portion and the end 74 is an enlarged threaded portion 76. The device is bored centrally to provide a bore 77 for the pressure unit.

Within the main portion of the body a bore 78 is provided enlarging into a bore 80 plugged by a screw 82. A lateral passage 84 interconnects bore 78 and a recess 86 in the main body portion, the recess having end surfaces 87 of relatively small area, and a lateral passage 88 connects to the passage 80 with an intervening plug 90 at the end of passage 80. Surrounding the main body portion 70 is a sleeve 94 provided with splines 96 and grooves to correspond with the splines on a part to be machined or otherwise handled for arcuate working.

The sleeve 94 has an inturned flange 98 received by an annular shoulder portion 100 at the end of the main body portion 70. This flange 98 is welded at 102 by hydrogen welding directly to the body, and the other cylindrical end of the sleeve is welded at 104 to the other end of the body 70. A threaded ring 106 is threaded on the body portion 76 and has an overhanging flange portion 108 to serve as a protection for the weld 104 and also to serve as a locator for a part to be mounted on the expanding mandrel. The construction in Figure 2 has the same advantages with respect to retaining extremely high pressures as the device in Figure 1, and it has been found to be extremely effective in this regard.

In some cases it is desirable to remove the pressure elements from the respective bores 26 and 77, and this can be readily accomplished by removing plugs 50 and 60 of the embodiment of Figure 1 and plugs 82 and 90 of the embodiment of Figure 2. This permits the insertion of a push rod through the body to dislodge the sealing elements at the other end.

Another advantage of the present construction and one which is critical in many cases is the fact that the sleeve portions 54 and 94 can be carefully machined before application to the mandrel body and the wall thickness can be carefully controlled because of the smooth, cylindrical nature thereof. The recess is formed in the body itself, and the surface of this recess is not especially critical. The wall thickness of the sleeve is important in order that expansion will be extremely even throughout the sleeve length.

We claim:

1. An expanded mandrel comprising, a solid body adapted to be mounted on a machine tool, said body having a generally central bore for containing pressure from a relatively incompressible fluid, a generally cylindrical shell member overlying a portion of said body, said shell member and body cooperating to define a thin, closed annular chamber, said body having passageways connecting the end portions of said chamber with said bore, said bore having opposite ends communicating with the exterior of said body to facilitate complete filling of said bore with a fluid, means forming a removable obstruction in said bore between said passageways to facilitate positive filling of said passageways and chamber with the fluid, closure means for said bore and means disposed within said bore operable to create pressure therein, said chamber, passageways and said bore between said closure means cooperating to form substantially the entire reservoir for mandrel operating fluid, said reservoir having a volume smaller than the volume of material forming said body.

2. The mandrel defined in claim 1 wherein said bore extends in a substantially straight axial direction through said body, said closure means being removable, said closure means and obstruction being aligned in said bore with said pressure creating means to provide interior access to said pressure creating means.

3. The mandrel defined in claim 1 wherein the diameter of said bore comprises a minor portion of the cross sectional dimension of said body.

References Cited in the file of this patent
UNITED STATES PATENTS

| | | |
|---|---|---|
| 1,818,042 | Christman | Aug. 11, 1931 |
| 2,318,838 | Conradson | May 11, 1943 |
| 2,555,496 | Mackmann | June 5, 1951 |
| 2,630,039 | Klemm | Mar. 3, 1953 |
| 2,658,764 | Parker | Nov. 10, 1953 |
| 2,665,136 | Fallon | Jan. 5, 1954 |